Jan. 19, 1965     D. L. SWENSON ETAL     3,166,107
APPARATUS FOR SERIALLY FILLING CONTAINERS
Filed Jan. 23, 1963     2 Sheets-Sheet 1

INVENTORS
Robert F. Krupp
BY Donald L. Swenson
Townsend and Townsend
attorneys

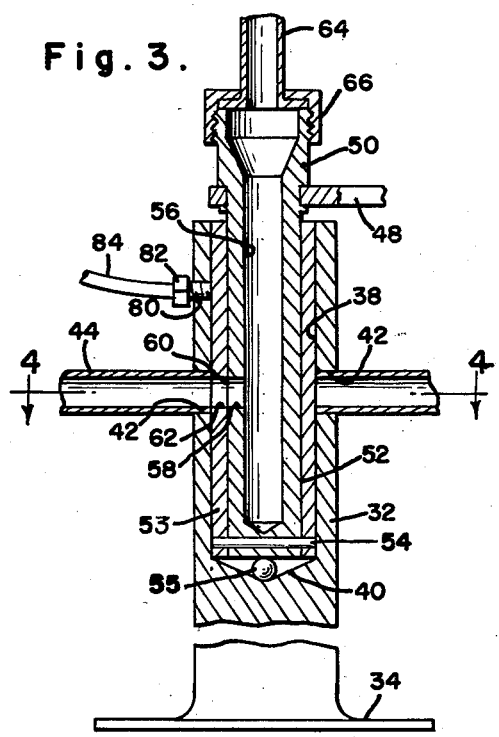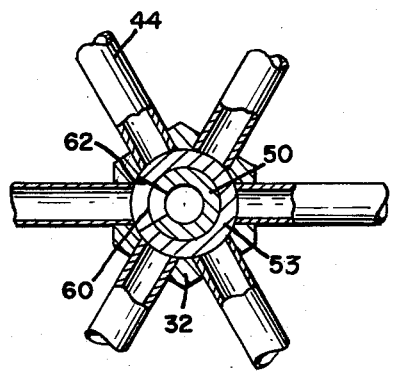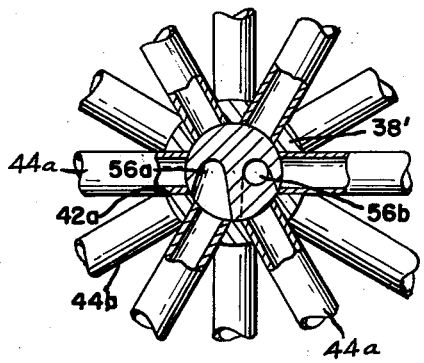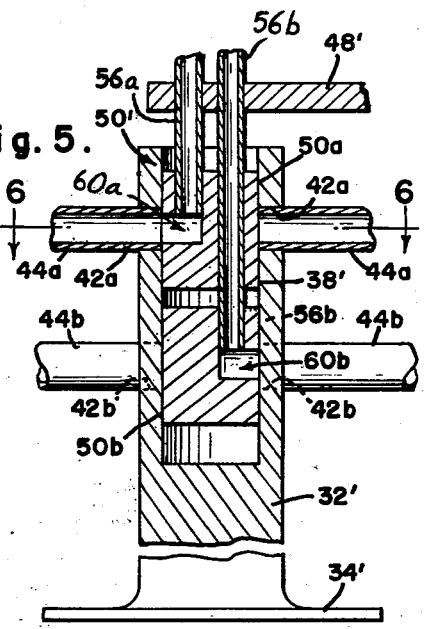
INVENTORS
Robert F. Krupp
BY Donald L. Swenson

United States Patent Office 3,166,107
Patented Jan. 19, 1965

3,166,107
APPARATUS FOR SERIALLY FILLING
CONTAINERS
Donald L. Swenson, San Leandro, and Robert F. Krupp, Oakland, Calif., assignors to Gerber Products Company, Oakland, Calif.
Filed Jan. 23, 1963, Ser. No. 253,464
9 Claims. (Cl. 141—145)

This invention relates to apparatus for serially filling containers with a viscous substance and more particularly relates to apparatus for so filling each container with a constant metered amount of the substance. The invention has particular application to filling jars with pureed food products but is not limited to such application.

Prior art devices, of which I have knowledge, for rapidly and automatically filling containers with a metered amount of a substance are extremely complicated and expensive. An important advantage of the present invention is that the apparatus can be made inexpensively and in an uncomplicated fashion that reduces or eliminates costly breakdowns.

The specific embodiment of the invention described in detail hereinafter includes a fixed central feeder tube that is closed at one end and has a cylindric surface in which is formed an orifice adapted to discharge the viscous substane under pressure. A sleeve having a bore sized for running rotative fit upon the cylindric surface has one or more openings therethrough that move into and out of registry with the orifice in response to rotation relative to the orifice. During registry of a sleeve opening with the orifice, the viscous substance is forced by a pump into the opening and then is conveyed to a container. The rotational speed of the sleeve on the tube and the volumetric output of the pump meter the amount of viscous substance deposited into the container.

An object of the present invention is to provide a container filler that can be installed in existing conveyor lines. Such lines normally include container cleaning and aligning devices preceeding the filler and cleaning, capping and labeling devices succeeding the filler.

Another object is to provide a container filler that can be readily disassembled for cleaning. This object is realized by providing a viscous substance feeding tube that depends into the bore of a sleeve that is rotatable relative to the feeder tube. When it is desired to clean the device, the feeder tube can be removed axially from the sleeve bore, and both tube and sleeve can be thoroughly cleaned by known techniques.

Still another object is to provide a fitting means for rapidly cleaning the apparatus, which object is attained by providing means on the sleeve for attaching a water hose thereto.

Yet another object of the present invention is to provide a container filling apparatus that fills the containers with the same amount of viscous substance irrespective of the speed at which the containers are transported through the apparatus. This object is implemented by supplying the viscous substance at a pressure that is directly proportional to the speed at which the containers are transported through the apparatus and to the speed of the sleeve relative to the feeder tube. As the latter relative speed increases the time of registry of the feeder tube orifice with the sleeve opening decreases, thus compensating for the increased pressure and consequent increased volumetric output of the viscous substance.

These and other objects will be more apparent after referring to the following specification and attached drawings in which:

FIGURE 3 is an enlarged view of the feeder tube-distributor sleeve assembly of FIGURE 1 in vertical cross section;

FIGURE 4 is a horizontal partial cross sectional view of the feeder tube-distributor sleeve assembly taken substantially along line 4—4 of FIGURE 3;

FIGURE 5 is a view similar to FIGURE 3 showing a modification of the apparatus in which the capacity can be substantially doubled; and FIGURE 6 is a horizontal partial cross section view of the modified apparatus taken substantially along line 6—6 of FIGURE 5.

Figure 1:
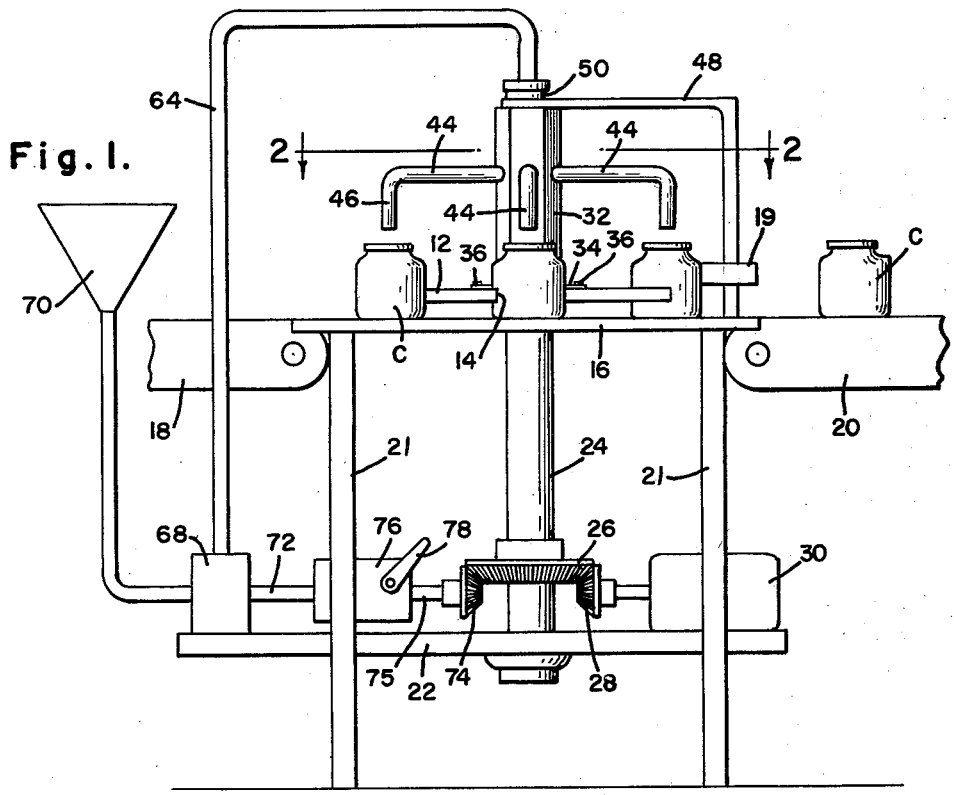
FIGURE 1 is an elevational view of the preferred embodiment of the present invention.

Referring more particularly to the drawings reference numeral 12 indicates a disc for transporting containers C through the apparatus in response to rotation of the disc. Disc 12 is formed with a plurality of notches or indentations 14 on the exterior periphery thereof for engaging containers C as they are slidably transported across a flat, horizontal table 16. Containers C are delivered to table 16 from a conventional conveyor belt or the like 18 and are removed from the filling apparatus by a pickup bar or discharge stripper 19 to a second conventional conveyor belt or the like 20. Conveyor belts 18 and 20 form parts of a conventional processing line.

Table 16 is supported by vertical members 21 which also support a horizontal platform 22 below the table. Journaled for rotation in table 16 and platform 22 is a drive shaft 24 to which disc 12 is secured for rotation with the drive shaft. Below table 16, a bevel gear 26 is provided on shaft 24 for meshing with a drive bevel gear 28 that is driven by a motor 30. Mounted on top of disc 12 in axial alignment with shaft 24 is a distributor sleeve 32 having on the bottom end thereof an enlarged flange 34 suitably apertured to receive bolts 36 for affixing the sleeve to the top surface of the disc.

Referring specifically to FIGURE 3, distributor sleeve 32 is formed with an internal bore 38 extending to the top of the sleeve and terminating interior of the sleeve in a conical portion 40. Sleeve 32 is formed with one or more openings 42 through the side wall thereof, which openings are preferably disposed radially relative bore 38. Attached to sleeve 32 is a conduit 44 in fluid communication with each opening 42. Each conduit 44 is formed with a discharge end 46 remote from sleeve 32 and adapted for communication with a container C in a notch 14 on disc 12. Equal interior diameter and shape of conduits 44 assure that each container C will be filled with a uniform amount of viscous substance.

Fixedly mounted to table 16 is a bracket 48 that supports discharge stripper 19 and also supports at its outer end a feeder tube 50. Feeder tube 50 is formed with an exterior cylindric surface 52 disposed in axial alignment with bore 38 of distributor sleeve 32. Between cylindric surface 52 and bore 38 is provided a bushing 53 which can be nylon, Teflon or the like. Bushing 53 is affixed to feeder tube 50 by a dowel pin 54 and affords a running fit between the feeder tube and distributor sleeve 32. Such running fit can also be provided without bushing 53 by enlarging the diameter of cylindric surface 52 or by reducing the inner diameter of bore 38. A ball bearing 55 can be placed in conical portion 40 of sleeve bore 38 to provide additional vertical thrust support for feeder tube 50.

Feeder tube 50 is formed with an interior longitudinal passage 56 and a hole 58 extending from the passage to cylindric surface 52, the hole terminating in an orifice 60 on the cylindric surface. Bushing 53 has a hole 62 through the wall thereof in continuous registry with hole 58 in feeder tube 50. An alternate equivalent structure is a bushing 53 formed with a hole therethrough in continuous registry with each opening 42 and fixed to distributor sleeve 32 for rotation therewith.

The size of orifice 60 relative to the size of openings 42 and the space between adjacent openings influence the amount of viscous substance that will be delivered through the openings during their registration with the orifice. Provision of an orifice 60 equal to or smaller than the space between adjacent openings is preferable, in that only one sleeve opening will be in communication with the orifice at a given time. It has been found, however, that the orifice size can be increased to communicate with 1½ openings 42 without adversely affecting uniformity of container filling.

Attached to the top end of feeder tube 50 for fluid communication with passage 56 is a duct 64. A threaded sanitary union coupling 66 removably secures a ferruled end of duct 64 to feeder tube 50 in order to afford ready disassembly for cleaning. The end of duct 64 remote from feeder tube 50 is attached to a conventional pump 68 to which viscous substance is supplied from a reservoir shown schematically at 70. The volumetric output of pump 68 is directly proportional to the rotational speed of a pump drive shaft 72. Shaft 72 is driven from main drive shaft 24 through a bevel gear 74 in meshing relation with bevel gear 26 and through shaft 75 through a conventional variable speed drive mechanism 76. Variable speed drive mechanism 76 includes a control lever 78 movement of which varies the rotational speed of shaft 72 relative to the rotational speed of shaft 75. Such movement effects control of the volumetric output of pump 68.

Figure 2:
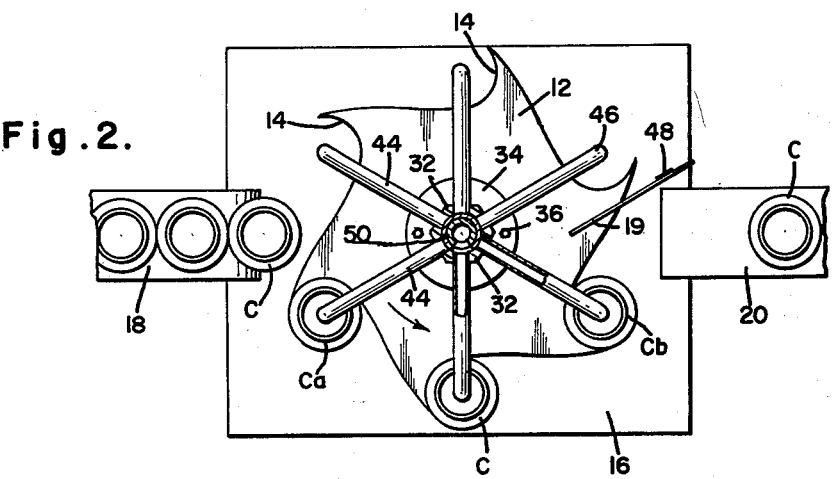
FIGURE 2 is a top view of the apparatus taken in partial cross section along line 2—2 of FIGURE 1.

In operation, reservoir 70 is filled with a desired viscous substance, such as pureed carrots, and motor 30 is energized. Containers C, which may be glass jars that have been previously sterilized and aligned by conventional apparatus not shown, are delivered to table 16 by conveyor 18 where each container is serially and sequentially engaged by a notch 14 on transporting disc 12. As viewed in FIGURE 2 a container designated $C_a$ will move along an arcuate path around feeder tube 50 in a counter clockwise direction. As the opening 42 which is associated with container $C_a$ moves into registry with feeder tube orifice 60, the viscous substance will be admitted into conduit 44 and discharged into the container through the end 46 of the conduit. When a container has reached the position designated as $C_b$ in FIGURE 2, the flow of viscous substance through conduit 44 will be terminated since an opening 42 is no longer in communication with orifice 60. The amount of substance supplied to a container is directly proportional to the volumetric output of pump 68 and is inversely proportional to the speed of sleeve 32 relative to feeder tube 50 (ignoring pressure change), which speed determines the duration of registry between feeder tube orifice 60 and an opening 42. Therefore, because the volumetric output of pump 68 and the speed of relative rotation of sleeve 32 and feeder tube 50 both vary with the speed of drive shaft 24, each container will receive a constant metered amount of viscous substance irrespective of the rotational speed of the main drive shaft. As containers C are transported in a counter clockwise direction by disc 12 the containers are withdrawn from the apparatus by discharge striper 19 and delivered to conveyor 20 for subsequent processing steps.

The present apparatus can accommodate substances of different viscosities and containers of different capacities. When it is desired to fill containers having a greater capacity control lever 78 is properly adjusted to increase the speed of shaft 72 relative to shaft 75 with the consequence that the volumetric output from pump 68 is increased. Thus, more viscous substance will be communicated from feeder tube orifice 60 to sleeve opening 42 and conduit 44 during the same period of registration with orifice 60. Assuming constant container capacity and increased viscosity of the substance to be conveyed to the jars, a similar adjustment of control lever 78 is necessary. The resultant increase in the output pressure and volume of pump 68 compensates for the increased viscosity of the substance so as to assure that the containers are filled with a proper amount of material. Once lever 78 is properly positioned for a given substance and a given container size, the apparatus is self-adjusting for variation in speed of operation.

Sleeve 32 can be provided with a threaded hole 80 through the side wall thereof for receiving a tube fitting 82 that is adapted to removably secure the end of a water tube or hose 84 in liquid communicating relation to the interstice between cylindric surface 52 and bore 38. Opening 80 can also be formed in feeder tube 50 in communication with a passage through the tube to the interstice. Between filling runs, water or the like can be supplied through tube 84 from a suitable source (not shown) to effect cleaning of the apparatus without complete disassembly thereof. Such cleaning is necessary each time a different viscous substance is used.

The capacity of the apparatus of this invention can be increased by incorporation of the modification as shown in FIGURES 5 and 6. A distributor sleeve 32' is provided with a flange 34' for attaching it to disc 12 in the manner described above. Distributor sleeve 32' is provided with openings 42a forming an upper group of openings for communicating the upper portion of bore 38' to the exterior surface of the sleeve; openings 42b are also provided in the sleeve and form a lower group of openings communicating the bore to the exterior sleeve surface. A feeder tube 50' is disposed in bore 38' and is formed with an upper cylindric drum 50a and a lower cylindric drum 50b positioned adjacent the upper and lower opening groups respectively. The cylindric surface of drum 50a is sized for running fit with bore 38' and is formed with a passage 56a therein which terminates in orifice 60a in the cylindric surface. Orifice 60a preferably lies in the same horizontal plane as the upper opening group. Drum 50b also has an exterior cylindric surface sized for running fit in bore 38' and includes a passage 56b which passage extends through drum 50a and through drum 50b to terminate in an orifice 60b in the same vertical plane as the lower opening group. Passages 56a and 56b are mounted to a bracket 48' which is fixedly attached to the table.

Associated with each opening 42a in the upper opening group is a conduit 44a of the same form as conduit 44 of FIGURE 1; associated with each opening 42b in the lower opening group in a similarly formed conduit 44b. Conduits 44a and 44b terminate in the same arcuate path or can terminate in different arcuate paths, in which case two transporting discs 12 are required. Passages 56a and 56b are supplied with viscous substance through a single duct 64, or through two such ducts, and either one or two pumps 68 can be provided. If two pumps 68 are used it is to be understood that they are substantially identical so that their volumetric outputs will be equal.

The operation of the modification of FIGURES 5 and 6 is similar to that described above in respect to FIGURES 1–4. As distributor sleeve 32' rotates, openings 42a will sequentially move into and out of registration with orifice 60a and openings 42b will move into and out of registration with orifice 60b to fill containers disposed in notches associated with each conduit 44a or 44b. The provision of inner openings of each conduit 44a and 44b of the same shape and diameter assures that equal amounts of viscous substance are supplied to each container.

It is to be understood that a structure having more than two feeder tube drums is within the scope of the present invention.

While one embodiment of my invention has been shown and described it will be obvious that other adaptations and modifications can be made without departing from the scope of the following claims.

What is claimed is:

1. Apparatus for serially filling containers with a predetermined amount of a viscous substance comprising a feeder tube having a wall with a cylindric outer surface and a hole through the wall terminating in an orifice in the cylindric surface, a sleeve mounted for rotative running fit on said feeder tube, said sleeve having at least one opening therethrough adapted to move into and out of at least partial coincidence with the feeder tube orifice in response to rotation of said sleeve relative said feeder tube so that viscous substance is delivered from said feeder tube orifice to said sleeve opening only when said opening coincides with said orifice, means for rotatably driving said sleeve, means for transporting a container along a path defined by an arc of a circle concentric with the cylindric outer surface of said feeder tube, said container transporting means being adapted to move the container at a rotative speed equal to the rotative speed of said sleeve, means defining a conduit rotatably movable with said sleeve for conveying viscous substance from said sleeve opening to a container in said container transporting means during viscous substance delivery to said sleeve opening, means for supplying viscous substance to said feeder tube at a pressure, and means for regulating the viscous substance supply pressure and volume relative to the speed of rotation of said sleeve.

2. Apparatus for filling jars with puree comprising a feeder tube formed from an elongate body having a cylindric exterior surface, a passage formed longitudinally therein and a hole extending from said passage to said cylindric surface and forming an orifice in said cylindric surface, a sleeve adapted for running fit upon the exterior surface of said feeder tube, said sleeve being formed with a plurality of equal size oepnings therethrough for serial puree receiving registration with said orifice, said openings being spaced around said sleeve and being uniformly spaced relative a plane perpendicular to the sleeve longitudinal axis, a plurality of conduits secured to said sleeve, an individual conduit extending radially outwardly from each said opening, each said conduit having a discharge end remote from said sleeve, means for rotating said sleeve relative said feeder tube so that said openings serially communicate with the orifice on said feeder tube to serially receive puree from said orifice, means for transporting jars along paths adapted so that jar openings are maintained in puree receiving relation to respective conduit discharge ends during puree delivery to the respective conduit, and means for supplying puree to said tube passage at a pressure and volume proportional to the speed of transportation of jars caused by said jar transporting means so that the quantity of puree delivered to each jar is independent of speed of jar transportation.

3. In combination with a container conveyor of the type wherein open top containers are transported upon a circular path by a circular disc that is rotatably driven about an axis through the center thereof which disc is formed with at least one container engaging notch in the peripheral margin thereof, apparatus for filling each container with a metered amount of flowable material comprising: a frame for rotatably mounting the circular disc, a feeder tube fixedly mounted to said frame at the center of the circular disc, said feeder tube having a wall defining a passage for flowable material, an exterior cylindric surface disposed coaxially with the container conveying disc, and a hole communicating said passage to an orifice in said cylindric surface; a sleeve adapted for running fit upon said cylindric surface, said sleeve being mounted for rotation with said container transporting disc relative said feeder tube, said sleeve having an opening therethrough associated with each said container engaging notch on said disc, each said opening being intermittently communicable with said orifice in said feeder tube in response to rotation of said sleeve relative said feeder tube, means for conveying flowable material from each said opening to a container disposed in the notch associated with the opening; means for supplying flowable material to said feeder tube passage at a controllably variable pressure and volume; and means for controllably varying the pressure and volume of said supply relative to the speed of rotation of said disc.

4. Apparatus for serially filling containers with metered amounts of a viscous substance comprising a frame, a drive shaft journaled on said frame for rotation about a vertical axis, container engaging means radially disposed relative said drive shaft for transporting containers along an arcuate path, a feeder tube fixedly mounted relative said frame, said feeder tube including a wall forming a passage for viscous material, said wall having a cylindric exterior surface disposed coaxially with said drive shaft, said feeder tube having a hole communicating said passage to an orifice in said cylindric surface, a sleeve rotatable with said drive shaft, said sleeve having a cylindric bore therein adapted for running fit relative said feeder tube, said sleeve being formed with an equal size opening associated with each container engaging means for seriatim intermittent fluid communication with the orifice in said feeder tube, a conduit defining a viscous material passage from each said opening to the container engaging means associated therewith, means for rotatably driving said drive shaft, means for supplying said feeder tube with viscous material at a controllable pressure and volume, and means responsive to the speed of rotation of said drive shaft for controlling the pressure and volume of the viscous material supplied to said feeder tube.

5. Apparatus for filling containers with a metered amount of a viscous substance comprising a frame, a feeder tube including first and second feeder drums fixedly mounted on said frame, said drums each being formed with a passage for viscous substance interior thereof and having mutually coaxial cylindric exterior surfaces, each said feeder drum being formed with a hole communicating said viscous material passage with an orifice in the respective cylindric surface, a sleeve mounted exterior said drums for running rotative fit relative said cylindric surfaces, said sleeve being formed with a first opening for intermitent communication with the orifice in said first drum, said sleeve being formed with a second opening spaced from said first opening for intermittent communication with the orifice in said second drum, means for rotatably driving said sleeve relative said drums, means for seriatim transporting containers along at least one arcuate path concentric with the drum cylindric surfaces, means for conveying viscous material from said first opening to containers transported by said transporting means, means for conveying viscous material from said second opening to containers transported by said transporting means, said viscous material conveying means each being adapted to convey viscous material to alternate containers on said transporting means, means for supplying viscous material to the passages in said first and second drums at a controllable pressure and volume, and means for controlling the pressure and volume of said viscous material supply means in proportion to the speed of rotation of said sleeve driving means.

6. Apparatus for filling containers with a metered amount of a viscous substance comprising a frame, a table defining a substantially horizontal flat surface supported on said frame, a drive shaft journaled in said frame and extending through said table, a disc mounted coaxially on said drive shaft spaced above said table surface, said disc formed with a plurality of container engaging notches in the periphery thereof and being adapted to transport containers along an arcuate path on said table, a sleeve mounted coaxially on said drive shaft above said disc, said sleeve being centrally bored and having a plurality of openings communicating the bore to the exterior of said sleeve, one said opening being associated with each notch in said disc, a feeder tube fixedly mounted relative said frame and having a cylindric exterior surface depending into the bore of said sleeve for rotative running fit therein, said feeder tube being formed with a hole for communicating viscous substance to an orifice in the cylindric surface thereof and being axially disposed relative said sleeve to afford communication between the orifice and the openings in said sleeve, means for rotatably driving said drive shaft, means for supplying viscous substance to said feeder tube at a controllable pressure and volume, and means responsive to the speed of rotation of said drive shaft for controlling the pressure and volume of said viscous material, whereby movement of each opening in said sleeve into and out of communication with the orifice in said feeder tube permits passage of a metered amount of viscous substance into a container in the notch associated with said sleeve opening.

7. Apparatus for filling containers with a metered amount of a viscous substance comprising a frame, a table defining a horizontal surface fixed to said frame, a drive shaft rotatably journaled in said frame and extending through said table, a container transporting disc mounted on said shaft for rotation therewith, said disc being disposed above said table and having on the exterior periphery thereof a plurality of container engaging notches, a sleeve mounted coaxially of said drive shaft above said table, said sleeve having a central bore therein and upper and lower groups of openings communicating said bore to the exterior of said sleeve, each said opening being associated with one container engaging notch in said disc, a conduit communicating from each said opening to a container in the notch associated therewith, a feeder tube fixedly mounted to said frame and depending into the bore of said sleeve, said feeder tube being formed with a cylindric exterior surface that is adapted for running fit in the bore, said feeder tube being formed with an upper orifice and a lower orifice on the exterior cylindric surface thereof, said orifices being disposed for viscous substance communication with openings in the respective groups of openings in said sleeve, means for rotatably driving said shaft, means for supplying a viscous substance to said feeder tube at a controllable pressure and volume, and means responsive to the speed of rotation of said shaft for controlling the pressure and volume of said viscous substance supply means.

8. Apparatus for seriatim filling containers with equal amounts of a viscous substance comprising means for transporting containers along an arcuate path, said container transporting means including a rotatable member formed with a plurality of container engaging indentations, each indentation being disposed at an equal radial distance relative the axis of rotation of said rotatable member, a sleeve mounted for rotation with said rotatable member, said sleeve having a central bore coaxial with the axis of rotation of said rotatable member, said sleeve further having a plurality of openings for communicating viscous substance from said bore to the exterior of said sleeve, each said opening being associated with one container engaging indentation, a plurality of conduits attached to said sleeve and extending radially therefrom, each said conduit being in viscous substance communication with one of said openings and having a discharge end proximate the container engaging indentation associated with the opening for discharging viscous substance into a container in the associated indentation, a viscous substance feeder tube fixedly mounted relative said frame, said feeder tube having a cylindric exterior surface depending into said sleeve bore and a passage for viscous substance terminating in an orifice on said cylindric surface, said orifice being adapted to sequentially communicate with said sleeve openings in response to rotation of said sleeve, means for rotatably driving said container transporting member, and means for supplying viscous material to said feeder tube at a pressure and volume proportional to the rotational speed of said driving means.

9. Apparatus for seriatim filling containers with equal amounts of a viscous substance comprising means for transporting containers along an arcuate path at preselected intervals between successive containers, a feeder tube fixedly mounted relative said container transporting means, said feeder tube having a cylindric exterior surface concentric with said arcuate path and a viscous material passage terminating in an orifice on said cylindric surface, a rotatable sleeve formed with a bore for running fit with the cylindric surface of said feeder tube, a plurality of conduits extending radially from said sleeve and rotatable therewith, said conduits each having a discharge end remote from said sleeve and being adapted to sequentially communicate viscous substance from said feeder tube orifice to containers in said transporting means in response to rotation of said sleeve, means for rotatably driving said sleeve at a speed sufficient to maintain said conduit discharge ends in viscous substance delivering relation to containers in said transporting means, and means for supplying viscous material to said feeder tube at a pressure and volume proportional to the rotational speed of said sleeve.

References Cited by the Examiner
UNITED STATES PATENTS

| 1,123,548 | 1/15 | Kanellos | 141—183 |
| 2,392,054 | 1/46 | McKinnis | 41—183 X |
| 2,779,358 | 1/57 | Fechheimer | 141—150 X |

LAVERNE D. GEIGER, *Primary Examiner.*